Patented Jan. 29, 1946

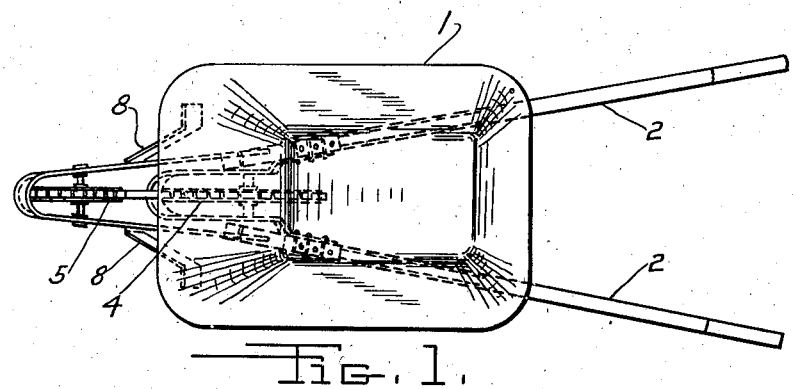
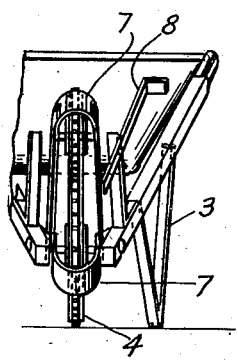
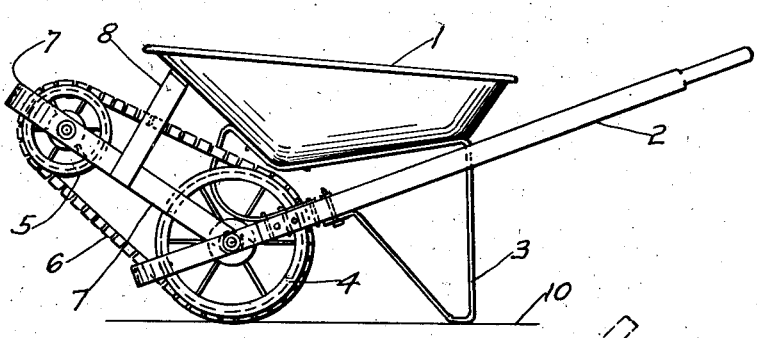
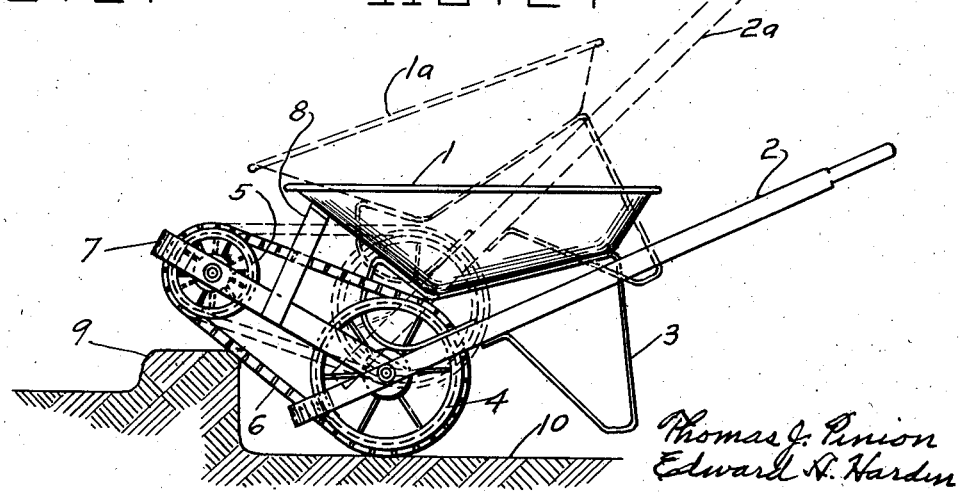

2,393,807

UNITED STATES PATENT OFFICE 2,393,807

WHEELBARROW

Thomas J. Pinion, Jefferson County, and Edward A. Hardin, Birmingham, Ala.

Application November 3, 1944, Serial No. 561,667

1 Claim. (Cl. 280—52)

This invention relates to a wheelbarrow and has for its main object to provide means whereby the wheelbarrow will be able to mount and pass over any ordinary obstruction in its way without causing undue effort on the part of the operator. The invention consists in a novel arrangement and combination of an auxiliary wheel and tractor type tread co-acting with the main wheel of the wheelbarrow.

Other objects and advantages will appear from the drawing and description.

By referring to the drawing, part of this application, it will be observed that Fig. 1 is a plan view of the wheelbarrow with the auxiliary means attached; Fig. 2 is a side elevational view of Fig. 1; Fig. 3 is a part front elevational view of Fig. 2; and Fig. 4 is a side elevational view of the wheelbarrow with auxiliary means attached, and showing the wheelbarrow in different positions as it starts to mount an obstruction also shown.

Similar reference numerals refer to similar parts through the several views.

Again referring to the drawing in detail it will be seen that the invention comprises a regular standard type wheelbarrow having a body 1, handles 2, legs 3 and a regular placed wheel 4. An auxiliary wheel 5 is mounted in front of the main wheel 4 and is carried suspended in a curved frame 7 that is held firmly in place by braces 8 attached to the front portion of the body 1. The main wheel 4 and auxiliary wheel 5 have a groove in the circumference rim of each and adapted to carry or fit a tractor type tread 6 that may be made of any suitable material with a non-stretchable core. Rubber over a chain is very satisfactory for this purpose. The dotted line position indicated by 1a and 2a shows how the operation is accomplished when it is desired to move the wheelbarrow from a lower place 10 to mount and pass over an obstruction 9.

Any ordinary adjustment means may be used to keep the tread in taut condition so as it will support the load between the wheels when passing over an obstruction..

From the foregoing it is apparent that the improved auxiliary means comprising the extra wheel and tread will enable the operator of the wheelbarrow to cause it to mount and pass over any ordinary obstruction without any great effort.

The device may be attached to any regular standard wheelbarrow by bolt means so as to be removable if desired and for replacement of a regular type of one main wheel.

The auxiliary parts may be made from any material best suited for the purpose.

While we have shown and described the preferred embodiment of our invention, we do not wish to limit same to the exact and precise details of structure, but reserve the right to make all modifications and changes so long as we remain within the spirit and scope of the following claim.

Having described our invention we claim:

A wheelbarrow having a body, handles and a main wheel in combination with obstruction mounting means, said means comprising an auxiliary wheel suspended and firmly supported by a frame and brackets in front of said wheelbarrow body, a groove in a circumference rim on said auxiliary wheel, a groove in a circumference rim on said main wheel, a tractor type tread adapted to fit into the groove on each of said wheels and looped around substantially half the circumference of each of said wheels and disposed to form a support between said wheels.

THOMAS J. PINION.
EDWARD A. HARDIN.